United States Patent [19]

Lang

[11] 4,329,712
[45] May 11, 1982

[54] ADAPTIVE DISTORTION ELIMINATION CIRCUITRY FOR A VIDEO DISC PLAYER

[75] Inventor: Frank B. Lang, Princeton Junction, N.J.

[73] Assignee: RCA Corporation, New York, N.Y.

[21] Appl. No.: 162,592

[22] Filed: Jun. 24, 1980

[51] Int. Cl.³ .......................... H04N 5/76; H04N 5/21
[52] U.S. Cl. .................................. 358/128.5; 358/167
[58] Field of Search ...................... 358/128.5, 36, 167, 358/188, 197, 198; 360/33

[56] References Cited

U.S. PATENT DOCUMENTS

| | | | |
|---|---|---|---|
| 3,132,339 | 5/1964 | Boughnou | 343/8 |
| 3,548,326 | 12/1970 | Bilotti | 329/1 |
| 3,862,361 | 6/1975 | George | 358/188 X |
| 3,934,263 | 1/1976 | Palmer | 358/4 |
| 3,988,531 | 10/1976 | Laub | 358/128.5 |
| 4,166,251 | 8/1979 | Ishigaki et al. | 329/132 |
| 4,250,459 | 2/1981 | Haass | 330/145 |
| 4,258,391 | 3/1981 | Papay | 358/197 |
| 4,272,786 | 6/1981 | Gibson | 358/128.5 |
| 4,275,419 | 6/1981 | Wilcox | 358/167 |

OTHER PUBLICATIONS

Terman, "Electronics & Radio Engineering", 4th Edition, 1955, pp. 1007-1010.

Primary Examiner—Aristotelis M. Psitos
Attorney, Agent, or Firm—E. M. Whitacre; J. S. Tripoli; E. P. Herrmann

[57] ABSTRACT

The present invention describes non-linear circuitry for reducing intermodulation distortion occurring in signals recovered from a disc record. The non-linear circuit generates complementary signals in a diode modulator for cancelling the undesired distortion components of the recovered signal. A synchronous detector in a servo loop with the non-linear circuit samples the distortion component of the resultant baseband video signal and applies bias to condition the non-linear circuit to further reduce the distortion-components. A reference signal for the detector is derived from the sound components of the recovered signal.

14 Claims, 6 Drawing Figures

ADAPTIVE DISTORTION ELIMINATION CIRCUITRY FOR A VIDEO DISC PLAYER

This invention relates generally to apparatus for reproducing information from a record medium, and more particularly to non-linear systems incorporated in a reproducing apparatus for reducing intermodulation distortion occurring between video and audio information recovered from a disc record.

Certain video disc playback systems incorporate disc records wherein the recorded information occurs as geometric variations imposed upon information tracks or grooves on the surface of a disc record. The disc, or at least a layer of the disc proximate its surface is conductive. A signal pickup stylus comprising a dielectric support element having a conductive electrode adherent to one of its faces engages the information track so that a measurable capacitance is formed between the conductive disc and the stylus electrode. Causing relative translation along the track between the pickup stylus and disc record produces a temporally varying capacitance in accordance with the geometric variations in the track. The varying capacitance is made part of a tuned circuit for modulating the resonant frequency of such circuit, permitting the detection of extremely small capacitance differences. A signal having a constant frequency near the nominal resonant frequency of the tuned circuit is applied across the tuned circuit, the amplitude of which is modulated by the changes in resonant frequency. The amplitude of this constant frequency signal is then detected to produce an electrical manifestation of the recorded information.

For video applications, the signal recorded on the disc record typically contains the linear sum of a high frequency picture carrier, frequency modulated by a composite signal formed from a baseband video signal and a phase and amplitude modulated chroma carrier, and, at least one lower frequency sound carrier, frequency modulated by a baseband audio signal. It has been observed that on recovery of signals in this format from the disc record, a distortion occurs which is manifested as the intermodulation products of the sound and picture carriers ultimately resulting in disturbing visual beats in the reproduced image displayed on a television receiver. The cause of the intermodulation distortion is believed to be the asymmetric shape of the stylus dielectric support element with respect to the stylus conductive electrode, which asymmetry is imposed by manufacturing constraints. Apparently the stylus dielectric skews the effective cross section of the disc record which the stylus electrode "sees" as it translates along the information track. For a more comprehensive explanation see U.S. Pat. No. 3,934,263 issued Jan. 20, 1976 to R. C. Palmer entitled "Video Disc Recording Apparatus and Methods", assigned to the common assignee with the present invention.

The distortion or visual beats can be reduced by generating further intermodulation products which are complementary (in phase) to the distortion signals, and linearly summing the generated signal with modulated picture carrier to effect a cancellation of the undesired distortion signals. The generation of the cancellation signals is performed by passing the recovered signal, comprising the sound and picture carriers, through a non-linear aperture corrector, or NLAC, including non-linear circuit elements arranged to form a product modulator. The performance of such circuitry is dependent upon the amount of bias current or bias voltage applied to the non-linear circuit elements, permitting regulation of the amplitude of the cancellation signal by varying the bias parameters.

In accordance with the present invention a circuit means is provided for sampling the undesired intermodulation signal occurring in the corrected or compensated baseband signal and generating an appropriate bias parameter for conditioning the non-linear circuitry to further reduce the undesired distortion.

A portion of the baseband video signal is filtered to extract the undesired distortion frequency components of the video signal. These components are applied to one of the input terminals of a synchronous detector. A portion of the unprocessed composite picture and sound signal available from the signal pickup circuitry is filtered to extract the sound carrier. The sound carrier is phase adjusted and applied as a reference signal to a second input terminal of the synchronous detector, the output signal thereof being indicative of the amplitude of the distortion signal present in baseband video. The output signal from the synchronous detector is amplitude conditioned and applied to bias the non-linear correction circuit.

Figure 1:
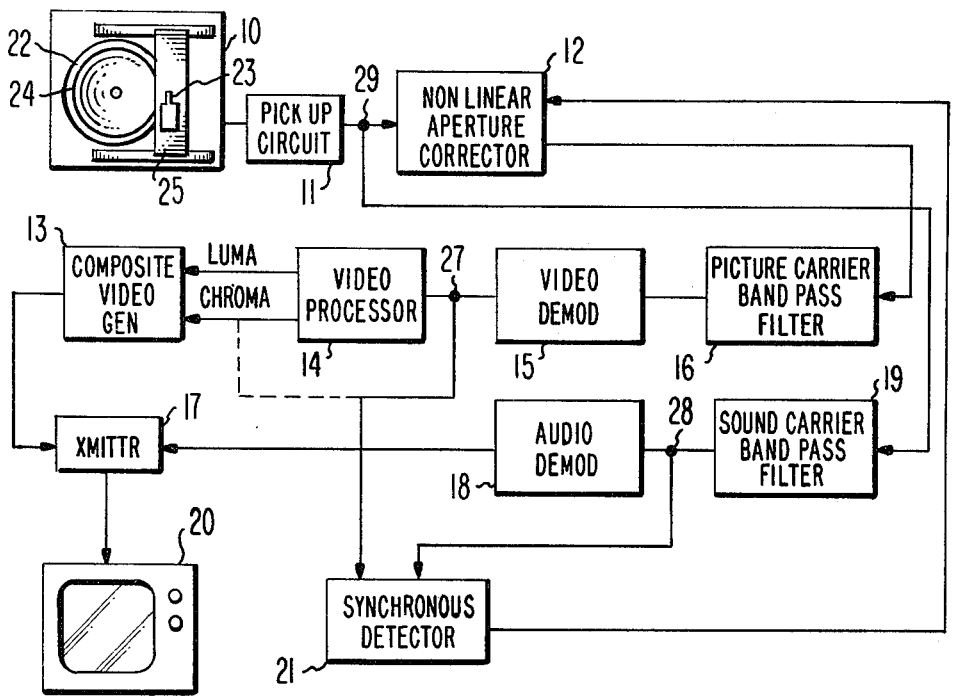
FIG. 1 is a block diagram of a video disc player apparatus embodying the present invention.

Referring to FIG. 1, a video disc player 10 has a turntable 22 for rotatably supporting a disc record 24 having information tracks thereon containing composite picture and sound components of a video signal. The player includes a signal pickup cartridge 23 removably mounted in a carriage assembly 25 which is subject to radial translation across the disc record in correlation with the rotation of the turntable. The cartridge 23 houses a signal pickup stylus which engages the disc record and cooperates with the pickup circuitry 11 to recover the prerecorded information from the disc record. The recovered signal, which is the composite sum of a picture FM carrier, a sound FM carrier and the aforementioned undesired intermodulation products, is available as an electrical output signal from the pickup circuitry 11 and is applied to the NLAC circuit 12.

The NLAC circuit 12 cooperating with the synchronous detector 21 operates to reduce the visual beat appearing in the displayed picture. The output signal from the NLAC circuit is filtered by circuit 16 to extract the FM picture carrier which is demodulated to baseband video by circuit 15, undergoes chrominance and luminance signal separation in circuit 14 and is reformatted in standard TV signal format, such as NTSC in the composite video generator 13. The demodulated video signal at circuit node 27 is applied to the synchronous detector which selectively samples the distortion components of the video signal. Synchronous detector 21 applies a bias parameter to the NLAC 12 in accordance with the amplitude of the distortion components to further reduce the distortion components.

The recovered signal available from the pickup circuitry 11 is also applied to the sound carrier band-pass filter 19, which extracts the FM sound carrier, the carrier then being demodulated to baseband audio in demodulator 18. Baseband audio and video signals are applied to transmitter 17 which form a suitable signal for delivery to a TV receiver 20.

Figure 2:
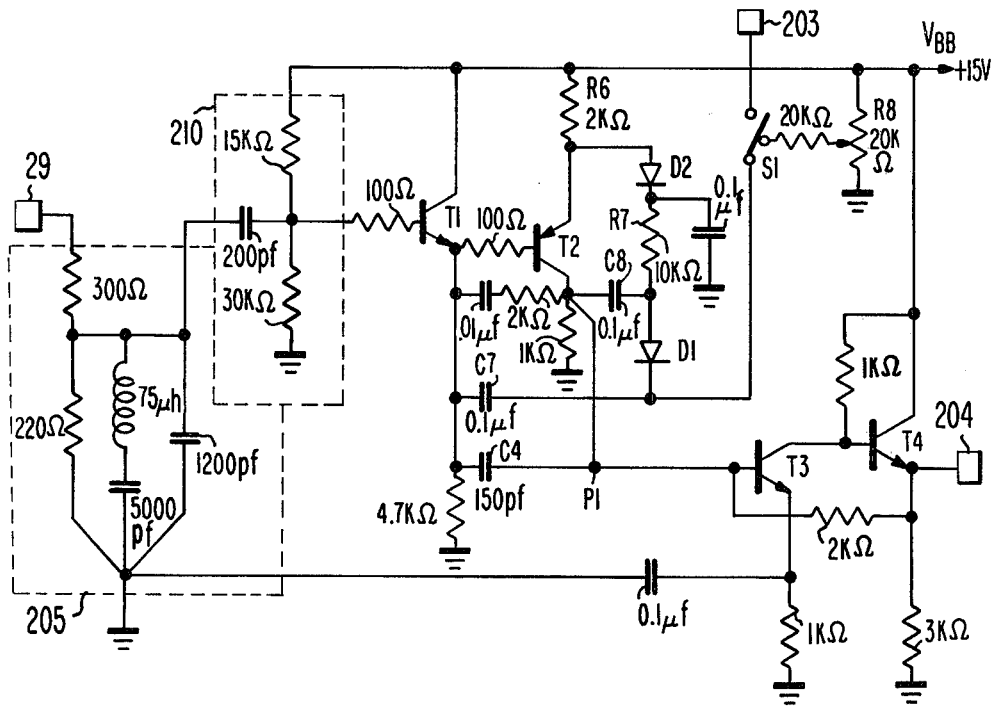
FIG. 2 is a schematic diagram of a non-linear aperture correction circuit.

The non-linear aperture corrector of FIG. 2 affects substantial removal of non-linear distortions manifested as sound carrier interference in the video output display. The intermodulation distortion appears in the composite recovered signal as undesirable sidebands to the picture FM carrier which sidebands contain sound carrier information. The NLAC circuit generates signals similar to the undesirable sidebands but 180° out of phase thereto and adds these generated signals to the composite signal to effect a cancellation of the undesirable sidebands.

The input section 205 to the circuit peaks the sound carrier with respect to the picture carrier and imparts a 90 degree phase shift to the picture carrier. The circuitry 210 high pass filters the composite signal to reject electrical noise below the sound carrier spectral bands. Transistor T1 operating as an emitter follower buffers the signal, making it available at its emitter electrode.

The signal is applied via capacitor C7 to diode D1 which operates as a modulator whereby the sound carrier modulates the picture carrier to produce sidebands to the picture carrier similar to the undesired distortion sidebands generated by the signal recovery apparatus but 180° out of phase therewith. The modulated signal is applied via capacitor C8 to the collector electrode of transistor T2. Transistor T2 having the composite signal applied to its base electrode and having a non-linear emitter load resistance by virtue of diode D2 generates a signal at its collector which when combined with the modulated signal from diode D1 results in a further signal containing modulation products but with suppressed carriers. This further signal is applied to node P1. The recovered signal available at the emitter electrode of transistor T1 and containing the undesired distortion sidebands is combined with the further signal at node P1 via capacitor C4, tending to cancel the undesired components. The resultant signal is amplified by transistors T3 and T4 and made available at output terminal 204 of the NLAC circuit. Terminal 204 is connected to the picture filter circuit 16.

The amplitude of the modulated signals generated by diodes D1 and D2 is dependent upon the dc bias current conducted in the diodes. If the bias current is too low in amplitude the modulation products generated by the diodes will be insufficient to cancel the distortion signal in the video signal, and such distortion signal will appear in baseband video at a relative phase angle of zero degrees. Alternatively if the bias current is too large in amplitude the modulation products generated by the diodes will be in excess of the amount required to cancel the distortion signal and the excess of the modulation signal will appear in baseband video at a phase angle of 180° relative to the distortion signal.

The diode bias current, is established by the potentiometer R8, i.e., with switch S1 connecting R8 to the cathode of diode D1 dc current flows successively through resistor R6, diode D2, resistor R7, diode D1, through switch S1 and finally through potentiometer R8. However, it should be recognized that different disc record-stylus combinations will produce different levels of distortion components in the recovered signal requiring different amplitude cancellation signals from the diode circuit. It is therefore advantageous to apply an adaptive bias level to the diodes, which adaptive bias current may be applied to terminal 203. (With an adaptive bias current applied to terminal 203 switch S1 would be arranged to connect terminal 203 to the cathode of diode D1.)

An adaptive bias current for the NLAC circuit may be accomplished in a feed forward configuration wherein the bias amplitude is adjusted in accordance with the amplitude of the distortion components of the recovered signal at the output terminal of the pickup circuit 11. This mode of operation is subject to the errors attendant the parameter drift of nominal circuit elements. A feed-back bias generation circuit, on the other hand, measures the amplitude of the resultant distortion after correction to generate the requisite bias current to further reduce the distortion and thereby effectively self compensates for the parameter drift of the circuit elements. The present invention utilizes this latter technique.

Figure 3:
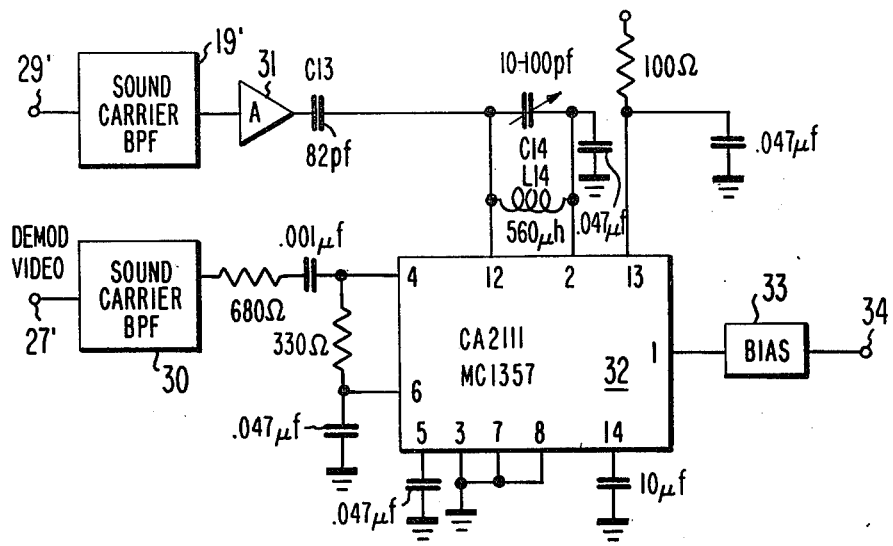
FIGS. 3 and 5 are partial schematic and partial block diagrams of alternate synchronous detection systems embodying the present invention.

FIG. 3 illustrates one particular embodiment of a feed-back apparatus for generating an adaptive bias current relative to the amplitude of the undesired distortion components in the demodulated video signal. In FIG. 3, demodulated video is applied to terminal 27', recovered signal from the pickup circuitry 11 is applied to terminal 29' and bias current proportional to the amplitude of the distortion components is available at output terminal 34, which bias current may be applied to terminal 203 in the FIG. 2 NLAC circuit.

The demodulated or baseband video is applied to the sound carrier band-pass filter 30 to extract the distortion components of signal which occur at the spectral bands of the sound carrier. Note that if the video signal is acquired directly from the video demodulator, a portion of the video signal, i.e., that portion of video occurring at the sound carrier frequency, will be present in the signal passed by filter 30. This video component is generally uncorrelated with the sound carrier and if synchronously detected therewith produces a signal component which is essentially too small to objectionably affect the feed-back circuit performance. However, for player systems which incorporate means to separate the luminance from the vertical detail and chrominance components of the video signals it is advantageous to sample the distortion components in the vertical detail and chrominance components of the video signal for deriving the NLAC bias current (indicated by the dashed line in FIG. 1) as the distortion signal can be more selectively sampled at this point. The filtered video is applied to one input terminal, pin 4, of the synchronous detector 32. In order to selectively sample the amplitude of the distortion components of the signal with a synchronous detector a reference signal of like frequency must be applied. The reference frequency is derived from the sound carrier which is extracted from the recovered signal by the sound carrier band-pass filter 19', which may be the band-pass filter 19 in the sound channel of the player or it may be a separate filter circuit. Signal from the filter 19' is amplified by the amplifier 31 and applied via capacitor C13 to the synchronous detector input terminal 12. The gain of the amplifier 31 is arranged to effectively limit the sound signal so that variations in the amplitude of the sound carrier will not be reflected in the detector output, i.e., detector output variations will depend only from amplitude variations of the distortion signal components. The tuned circuit comprising capacitor C14 and inductor L14 connected at input terminal 12 of the synchronous detector is incorporated to adjust the phase angle of the reference signal with respect to the phase angle of the distortion signal.

The synchronous detector 32 which may be a doubly balanced product detector such as the RCA Corporation CA2111 integrated circuit (and see U.S. Pat. No. 3,548,326 issued Dec. 15, 1970 to A. Bilotti entitled "Direct Coupled Limiter-Discriminator Circuit"), provides an output potential at terminal 1 which linearly increases from a reference level when the amplitude of the filtered video signal, i.e., the distortion signal, increases and the video and reference signals are in phase. The output potential linearly decreases from the reference level when the distortion signal increases and the video and reference signals are out of phase. Thus a bidirectional signal, with respect to the reference level, is obtained from which a bidirectional current may be generated, (with respect to a reference current). Since the distortion signal goes through a phase change when the bias current amplitude traverses the optimum level where the cancellation signal equals the distortion components of the picture signal, the bias level produced by the synchronous detector will effectively change polarity to tend to maintain the distortion components at the most reduced level commensurate with the sensitivity and frequency response of the feedback network.

The synchronous detector output potential at terminal 1 is converted to an output current by circuit 33 and the output current at terminal 34 is applied to the NLAC circuit, e.g., terminal 203 in the FIG. 2 circuit.

Figure 4A:
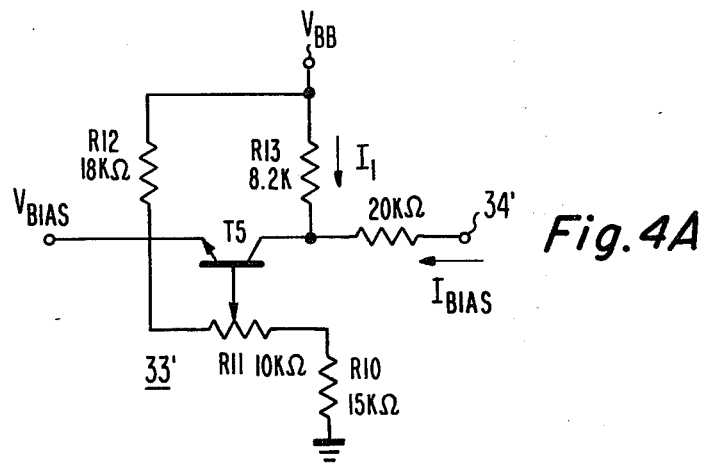
FIGS. 4A and 4B are respectively circuit schematic diagrams of the bias conditioning and the amplifier circuits indicated in the FIG. 3 drawing.

FIG. 4A illustrates one circuit for realizing the voltage to current converter 33. Transistor T5 arranged as a common base amplifier has the amplitude of its collector current, $I_c$, modulated by the potential, $V_{bias}$, applied between its input or emitter electrode and ground potential ($V_{bias}$ being the potential available at output terminal 1 of detector 32). The collector current can be shown to be approximately equal to:

$$I_c = \frac{V_B - V_{bias}}{R_e + R_T/\beta} \quad (1)$$

where $\beta$ is the forward current gain of the transistor, $V_B$ is the dc potential established at the base electrode of the transistor T5 by resistors R10, R11 and R12 minus the forward base-emitter potential drop of T5, $R_T$ is the Thevenin equivalent resistance of resistors R10, R11 and R12 as seen from the base electrode of transistor T5 and $R_e$ is the inherent incremental emitter resistance. The collector current is also the linear sum of the current $I_1$ conducted in the collector resistor R13 and the output current $I_{bias}$, conducted in terminal 34', thus $I_{bias}$ is seen to be linearly related to the input voltage $V_{bias}$. The nominal value of the transistor collector current for a nominal or reference value of $V_{bias}$ is established by adjusting the potentiometer R11 to minimize the distortion signal in the video signal with the video signal disconnected from the synchronous detector circuitry.

Figure 4B:
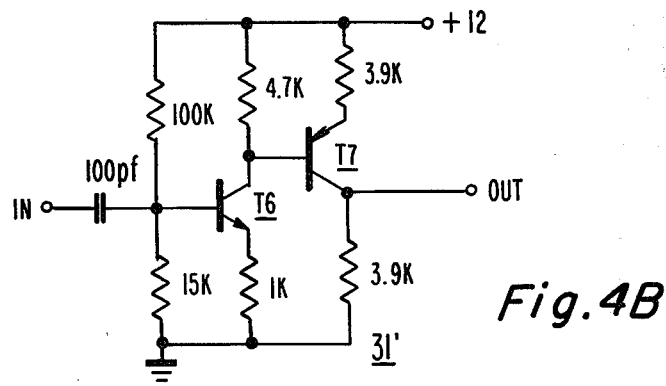

FIG. 4B is illustrative of a transistor amplifier 31' which may be utilized to amplify the reference sound carrier in the FIG. 3 circuit. Amplifier 31' comprises a first common emitter amplifier T6 in cascade with a second common emitter amplifier T7 to form a composite non-inverting amplifier with a gain of approximately 4.5.

Figure 5:
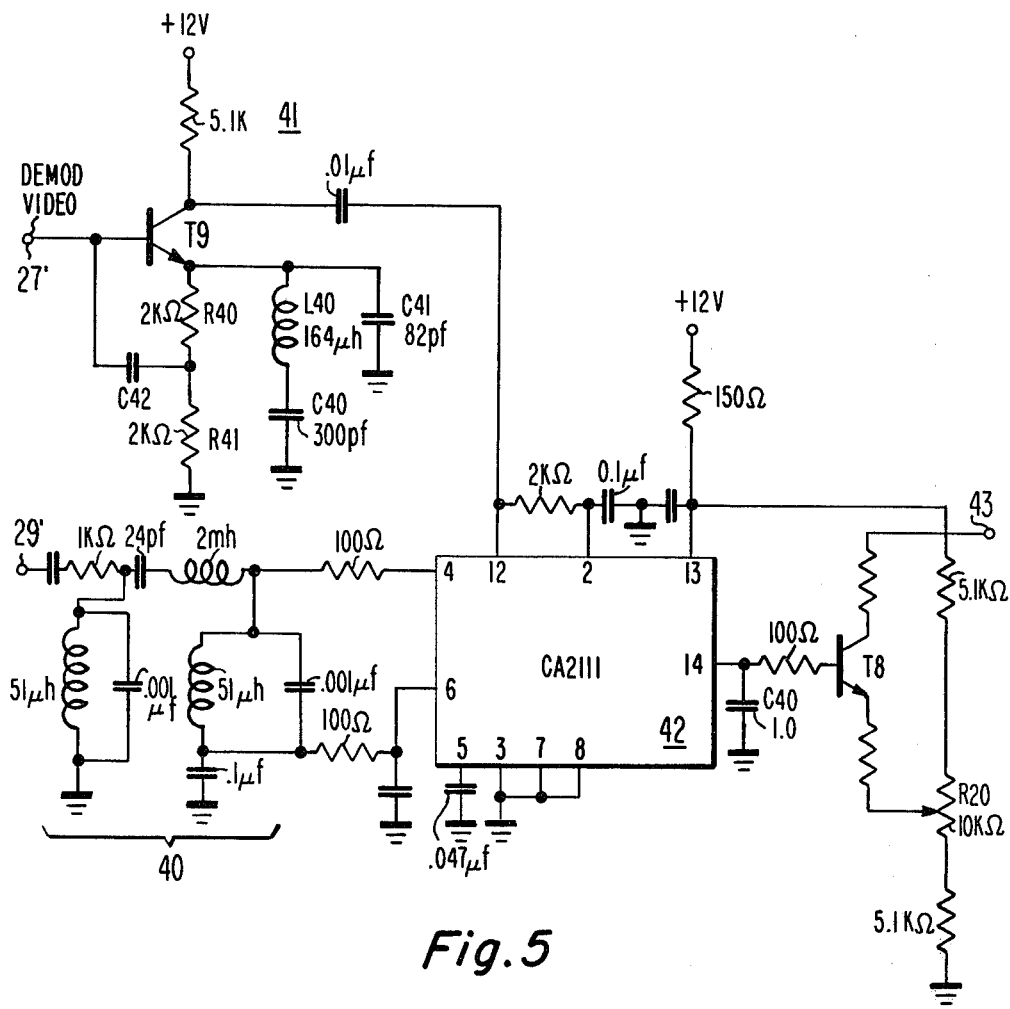

FIG. 5 is illustrative of a further embodiment of the invention wherein the baseband video and reference signals are applied, in the reverse mode, to the input terminals of the synchronous detector, relative to the FIG. 3 connections. In FIG. 5, baseband video is applied to the tuned amplifier 41 which substantially enhances signals occurring in the spectral band containing the distortion-components of the video signal. The output signal of amplifier 41 is applied to the input terminal 12 of detector 42. Recovered signal from the pickup circuitry is applied to terminal 29'. This signal is passed through band-pass filter 40 which extracts the sound carrier and applies it to input terminal 4. Output signal is taken directly off the integrating capacitor C40 at detector terminal 14, which signal is converted to an output current by common emitter-transistor T8. Output current for biasing the NLAC circuit is available at terminal 43. The null or nominal current level wherein the NLAC circuit most effectively reduces the undesired distortion is established by adjusting potentiometer R20.

The tuned amplifier 41 comprises a common emitter amplifier T9 having a frequency sensitive emitter impedance and a fixed collector or load impedance. The gain of the amplifier is proportional to the ratio of the collector impedance to the emitter impedance. In the emitter circuit the series connected inductor L40 and capacitor C40 are series resonant at the spectral band containing the distortion components of signal, thereby creating a relatively low emitter impedance or a high amplifier gain in this spectral band. The capacitor C41 and the series elements L40, C40 form a parallel resonant circuit at the chroma carrier frequency, thereby creating a relatively high emitter impedance and low amplifier gain at this spectral band to reduce the chroma signal present at the detector input terminal. Capacitor C42 couples a portion of the input potential to the connection between resistors R40 and R41. This effectively increases the resistance of R40 as seen by the emitter of T9 at frequencies below the distortion signal band and reduces the low frequency gain of the amplifier.

What is claimed is:

1. In a disc record player for information recovery of video and sound signals, an apparatus comprising:
    means for recovering modulated information signals including video signals with sound accompaniment from a disc record, said recovery means having a non-linear response;
    an adjustable non-linear compensating means, coupled to said recovery means, for reducing intermodulation distortion in the recovered signals;
    means, coupled to said compensating means, for demodulating the information signals; and
    a synchronous detector means responsive to said demodulated information signals and to recovered sound accompaniment components for providing a control signal to the non-linear compensating means for reducing said intermodulation distortion.

2. A disc record player apparatus for information recovery of video and sound signals comprising:
    first means for recovering prerecorded information signals from a disc record, the recovered signal including a modulated picture carrier and a modulated sound carrier;
    a non-linear compensating means, coupled to said first means for reducing undesired intermodulation signals in the recovered signal, having a first output terminal at which corrected recovered signal is available, and having a control terminal for applying a bias parameter, said bias parameter conditioning the response of the compensating means;

second means coupled to the output terminal of the compensating means for selectively demodulating the picture carrier to produce baseband video signals;

third means coupled to the second means for selectively passing signals contained in the same spectral band as the sound carrier to an output terminal thereof;

fourth means coupled to the first means for selectively passing the sound carrier component of the recovered signal to an output terminal thereof;

a synchronous detector having a signal input terminal and a reference signal input terminal, said detector generating an output signal at an output terminal thereof;

means for connecting the output terminal of one of said third and fourth means to the signal input terminal of the synchronous detector;

means for connecting the output terminal of the other of said third and fourth means to the reference signal input terminal of the synchronous detector;

fifth means having an input terminal connected to the output terminal of the synchronous detector and having an output terminal connected to the control terminal of the compensating means for conditioning the detector output signal to bias the compensating means to reduce said undesired intermodulation signals.

3. The apparatus as set forth in claim 2 wherein the second circuit means comprises:
 a band-pass filter coupled to the compensating means for passing signals encompassed in the spectral band of the modulated picture carrier; and
 an FM demodulator coupled to the band-pass filter to provide baseband video signals.

4. The apparatus set forth in claim 2 wherein said third and fourth means comprise respective filters for selecting signals occurring in the spectral bands encompassing the modulated sound carrier.

5. The apparatus set forth in claim 2 wherein the fifth means comprises a voltage to current converter.

6. The apparatus set forth in claim 2 wherein the fifth means comprises:
 a transistor having first and second electrodes and a principal conduction path there between, and having a control electrode, the principal conduction path being controlled by potential occurring between the control and the first electrode;
 means for generating a prescribed dc potential at an output terminal thereof;
 means for connecting one of said first and control electrodes of the transistor to the input terminal of the fifth means;
 means for connecting the other of said first and control electrodes of the transistor to the output terminal of the dc potential generating means; and
 means for connecting the second electrode of the transistor to the output terminal of the fifth means.

7. The apparatus as set forth in claim 2 wherein the synchronous detector is a double balanced product detector.

8. The apparatus set forth in claim 2, 3, 4, 5, 6 or 7 wherein the means connecting the output terminal of said fourth means to the synchronous detector comprises:

an amplifier to condition the amplitude of the sound carrier to a level such that variations in the amplitude of the sound carrier will have substantially no effect on the amplitude of the synchronous detector output signal; and circuit means coupled to the amplifier for conditioning the phase angle of the sound carrier relative to the phase angle of the distortion signal components.

9. A video disc playback apparatus of the type for recovering information signals from a disc record, said information signals including a modulated picture carrier and a modulated sound carrier, said apparatus having means for selectively demodulating the picture carrier to provide baseband video signals and means for selectively extracting the sound carrier signal from the recovered signals, said apparatus further having compensating means for reducing undesirable distortion signal components in the recovered signals, said compensation means being responsive to a bias signal generated by detection circuitry for sensing the amplitude of the undesirable distortion occurring in the baseband video signal, said apparatus having improved detection circuitry comprising;

a synchronous detector having first and second signal input terminals and an output terminal;

means for applying said sound carrier to one of said first and second synchronous detector input terminals;

a frequency selective circuit having an input terminal connected for receiving said baseband video signals, said circuit producing at an output terminal thereof, the distortion components of the video signal occurring in the spectral band containing the modulated sound carrier;

means connecting the output terminal of the frequency selective circuit to the other of said first and second synchronous detector input terminals; and means connected to the output terminal of the synchronous detector for conditioning the output signal thereat to bias said compensating means to further reduce the undesirable distortion signal components.

10. The apparatus set forth in claim 9 wherein the means for applying the sound carrier to the synchronous detector comprises:
 an amplifier for increasing the amplitude of the sound carrier to a level such that the amplitude of the synchronous detector output signal will be unaffected by amplitude variations of the sound carrier; and
 means coupled to the amplifier for conditioning the sound carrier to have a prescribed phase relationship relative to the distortion-signal applied to the detector.

11. The apparatus set forth in claim 9 or 10 wherein the means for conditioning the output signal of the synchronous detectors comprises:
 a transistor having first and second electrodes and a principle conduction path therebetween, and having a control electrode, current in the principal conduction path being controlled by potential occurring between the control and the first electrode;
 means for generating a prescribed dc potential at an output terminal thereof;

means for connecting one of said first and control electrodes of the transistor to the output terminal of the dc potential generating means;

means for connecting the other of said first and control electrodes of the transistor to the output terminal of the synchronous detector; and means for connecting the second electrode of the transistor to apply bias signal to said compensating means.

12. The apparatus set forth in claim 9 or 10 wherein the means for conditioning the output signal from the synchronous detector is a voltage to current converter.

13. The apparatus set forth in claims 9 or 10 wherein the frequency selective circuit is a band-pass filter tuned to pass signals within the spectral band of the modulated sound carrier.

14. The apparatus set forth in claims 9 or 10 wherein the frequency selective circuit is a tuned amplifier, tuned to enhance signals within the spectral band of the modulated sound carrier with respect to all other signals.

* * * * *